Aug. 18, 1953  W. WILSMANN  2,649,377
CONTINUOUS BUTTERMAKING PROCESS AND APPARATUS
Filed Oct. 14, 1950  2 Sheets—Sheet 1
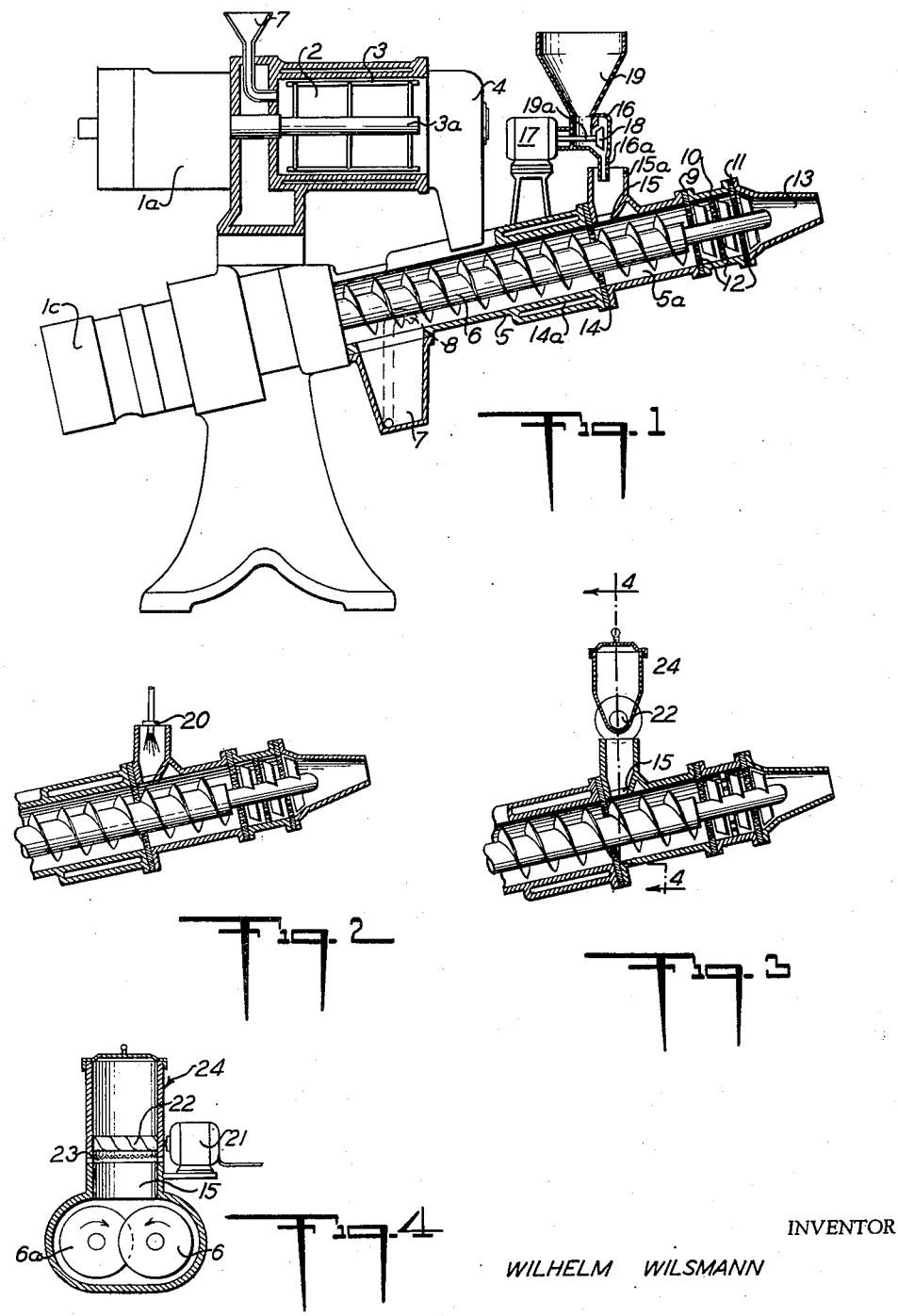
INVENTOR
WILHELM WILSMANN
BY Burgess & Dinkelage
ATTORNEYS

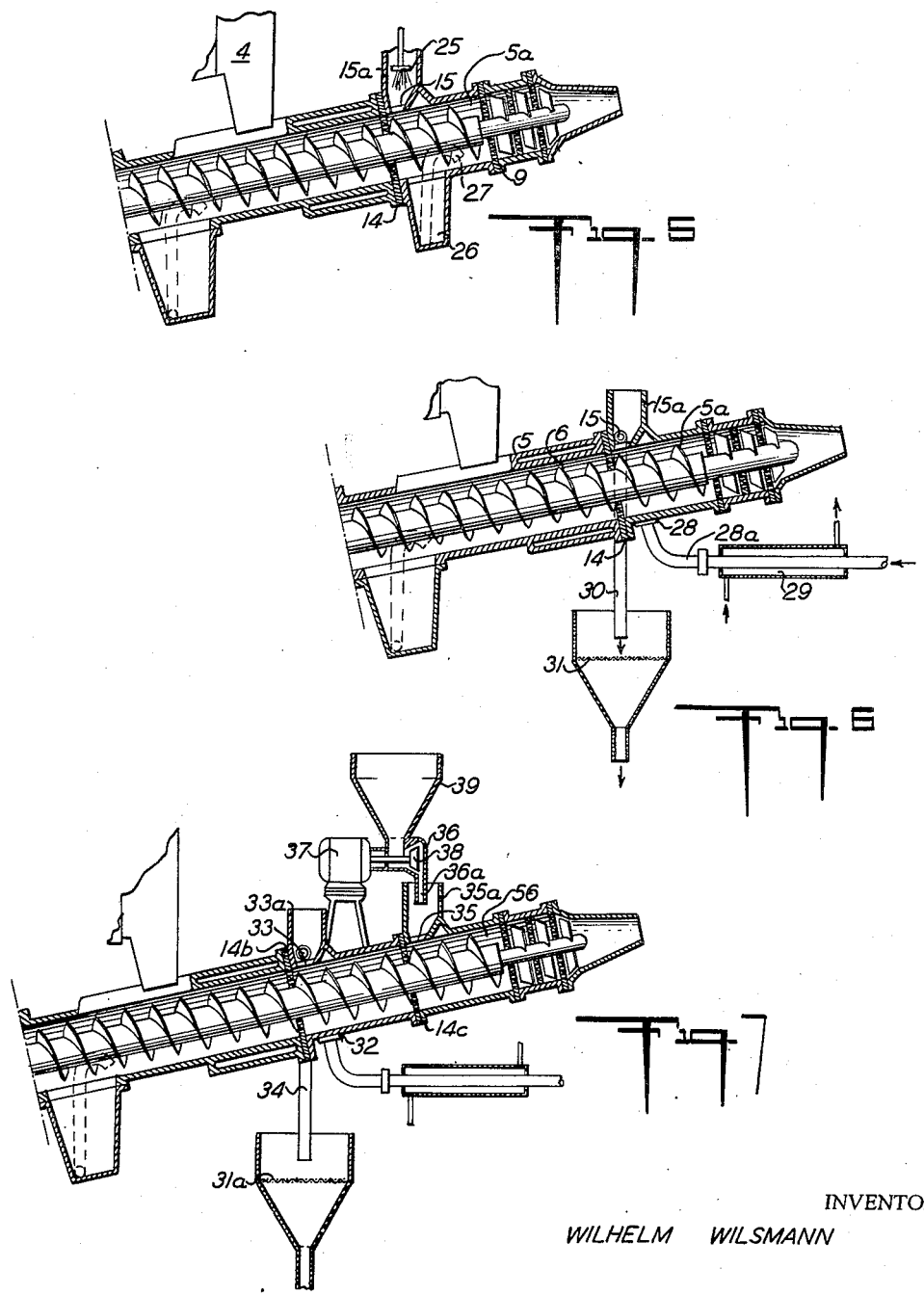

Patented Aug. 18, 1953

2,649,377

UNITED STATES PATENT OFFICE 2,649,377

CONTINUOUS BUTTERMAKING PROCESS AND APPARATUS

Wilhelm Wilsmann, Oelde, Westphalia, Germany, assignor to Westfalia Separator, A. G., Oelde, Germany, a German corporation Application October 14, 1950, Serial No. 190,126
In Germany November 21, 1949

9 Claims. (Cl. 99—119)

1

This invention relates to new and useful improvements in continuous butter making.

In continuous butter making, a continuous flow of cream is subjected to a high speed beating or whipping action to be thereby converted into butter corn which is thereafter separated from the butter milk and subsequently crushed and mixed into a fine texture constituting the ultimate butter. A continuous butter making machine may thus, for example, comprise a buttering cylinder provided with a high speed beating arrangement, such as shaft mounted beating paddles, which convert the continuous flow of cream into the butter corn and a press-off cylinder which may be equipped with, for instance, 2 worms running in opposite directions to separate the butter corn from the butter milk. Provision is additionally made for means pressing and mixing the butter corn into a fine textured butter product which may be obtained then from the delivery end of the continuous butter machine in a continuously flowing string or ribbon of finished butter product.

The keeping qualities, taste and appearance of a butter product may be appreciably improved by the addition of salt, aroma-imparting substances, coloration, etc. but especially by the washing of the butter material. In the hitherto conventionally used intermittent butter production a certain amount of cream is charged into a tub or tub-like container and is beaten in the same until it is worked up into a butter of the desired texture. This butter is then washed with water prior to its removal from the tub, in order to remove albuminous substances and lactose therefrom, whereby improved keeping qualities of the butter are obtained. The butter, while still in the tub, is thereafter provided with additions of suitable materials, such as salt, aroma-imparting substances, coloring materials, etc., while slowly working the butter product so as to thoroughly incorporate these additions.

In the relatively recently developed, continuously operating butter machines, in which as above described, cream continuously flows into the machine and a ready butter product continuously emerges therefrom with a continuous discharge of separated butter milk, the washing of the butter and/or the addition of desired or required additives has presented considerable difficulties. In continuously operating buttering machines the butter milk is continuously removed at a location at which the butter corn and the butter milk are passed from the buttering cylinder into the press-off device. It is therefore not possible as is the case in continuous buttering operations using a butter tub, to first draw the butter milk and to thereafter add the washing water. If, on the other hand, wash water would be introduced at the point of passage of the butter corn and the butter milk into the press-off device, the butter milk would become diluted. A similar condition would prevail if butter-treating additives, such as, for instance, salt, bacteria cultures, aroma-imparting substances, coloring solutions and the like, would be added in this manner. These materials would only partially pass into the butter, being preponderantly removed with the butter milk, thereby rendering the same unusable.

One object of the invention comprises among others, arrangements for the simple and easy addition of butter-treating additives during continuous butter making operations.

The foregoing and other objects of the invention will be apparent from the following description read in conjunction with the drawings, in which:

Fig. 1 shows a side view of a continuous buttering machine with parts in cross-section and incorporating an embodiment in accordance with the invention;

Fig. 2 illustrates a cross-sectional side view of part of the construction shown in Fig. 1 except for an alternative embodiment of an additive supplying arrangement;

Fig. 3 is a cross-sectional side view of part of the construction shown in Fig. 1 and demonstrating yet another alternative of additive supplying arrangement;

Fig. 4 is a cross-sectional view of the construction shown in Fig. 3 on the plane IV—IV thereof; and Figs. 5, 6 and 7 show cross-sectional side views of parts of the constructions embodying still further alternatives in accordance with the invention.

In accordance with the invention butter treating additives are passed into the butter corn material at a stage of butter milk separation at which the major portion of the butter milk has been already separated from the butter corn and preferably to the extent of a butter milk balance or remnant which, on the one hand, will not seriously interfere with any additive admixture, and on the other, is relatively so small that its loss is practically insignificant. If the additive is not one for washing purposes this butter milk remnant may serve, if desired, to fix the water content of the butter. It is in this manner possible to further remove a certain portion of this butter milk whereby on account of the relatively small quantities thereof, it is not necessary to pay any particular attention to the quality of this butter milk. Wherever the expression "butter treating additives" or similar designation is used herein there is meant to be included thereby an additive for the treatment of butter products of the type which may be largely again removed prior to the final preparation of the finished product, as for example, a washing medium such as water and the like, as well as of the type which will partially or predominantly remain in the finished butter product, such as, for example, salt, aroma-imparting substances, coloring matter and the like. The expression as so used herein further includes within the intended meaning thereof such butter treating additives as may react with or act upon the butter or a component ingredient thereof, such as, for example, bacteria cultures, or the like.

Within the preferred embodiment of the invention the admixture of additives for the butter treatment is best made at a stage of the continuous buttering process at which there has been effected a preliminary pressing together of the butter corn but before the final working or kneading thereof into the ultimate butter texture. Normally solid additives may be admixed in accordance with the invention, either as such, or in substantially liquid form. Such liquid form may be that of a dispersion or solution of the material. Liquid additives may be added as such or in solution in a non-additive solvent or by way of emulsion in an additive or non-additive liquid. The additives may also include such materials as, for instance, another fat or fatty substance as for example a vegetable fat, which, depending on legal regulations in the various localities may be at times permissive for certain special purposes. An additive in the form of a suitable bacteria culture may be, for instance, a culture of lactic acid bacteria and preferably those of pre-selected pure grown strains in order to impart to the butter product a certain characteristic taste which is highly desired in many localities. Such a taste is otherwise frequently obtained by subjecting a sour cream to the buttering operation, whereby the cream may have soured either naturally, i. e., by fermentation with naturally occurring or wild strains of lactic acid bacteria, or may have been admixed for the purpose with pre-grown selected cultures of lactic acid bacteria.

One arrangement in accordance with the invention may, for instance, include one or two successively located openings on top of the mixing or kneading portion of a continuous buttering machine and preferably such portion immediately adjacent or in continuation of the press-off cylinder of such a machine whereby the butter treatment additive or additives may be added to the butter corn or partly finished butter product while the same is being worked or pressed together for its final conversion into the desired butter texture. The additives may be admixed at this stage in series in the event that several successive openings are present. Thus, for instance, water and non-aqueous additives may be admixed at successive stages of this pressing together or pre-kneading operation. In this manner when the water is added at the beginning portion of the pre-kneading operation the same will effectively serve to wash out the desired impurities from the butter product and will not on the other hand interfere with or leach out the solid additives, such as coloring material, aroma-imparting substances, etc. which are admixed at a more advanced stage of the pre-kneading operation by way of the second opening closer adjacent the final butter emerging end portion of the machine. When adding dry salt the latter may be finely dispersed into and through the opening by a simple distributor device. It may be then of advantage to combine the distributing arrangement of the salt or other solid additive with means for simultaneously finely grinding the same. Salt content is usually a question of agreement or trade desires or requirements. In Europe the salt content desired for a finished butter is frequently about 1.5–2%. In the United States the desired salt content is often about 2.5%.

One of the openings or apertures or such single aperture, as the case may be, serving the introduction of butter treating additive or additives, may be provided with a sprinkler or shower head or similar device for the purpose of effecting the admixture to the butter material in substantially liquid form, such as for example a salt solution, a solution of aroma-imparting materials, a solution of coloring matter, etc. It is also possible, if desired or expedient, to furnish wash water as an additive by way of direct connection to the source of water supply, the water conduit leading directly into the press-off cylinder at the desired location of the butter processing stage thereof. It is further possible to cut a heat-exchanger into the water supply conduit to thereby permit control of the temperature of the added water by either permitting the raising or lowering of said temperature in order to bring the same into accord with the required or desired temperature most favorable for the butter processing at the particular stage at which the water may be washed or most favorable to the washing operation itself in relation to such butter processing stage.

Referring to Fig. 1 cream, and preferably pre-cooled cream, is passed into the butter machine by way of the funnel 1, the continuous flow of cream so entering the machine being continuously beaten in the buttering cylinder 2 by way of the high speed beater bars or paddles 3 mounted on the high R. P. M. beater shaft 3a suitably driven by a conventional motor (not shown) located in housing 1a. Butter corn is rapidly formed by the high speed beating or whipping operation inside buttering cylinder 2, usually in a matter of seconds, and the mixture of butter corn and butter milk is passed from the buttering cylinder 2 by the beater action and continuously in-flowing cream, into the conduit or hood 4 through which it passes or drops into the press-off cylinder 5 through a suitable opening in the top thereof. Press-off cylinder 5 carries two counter-directionally rotating worms 6 and 6a (Figs. 1 and 4) which are driven by suitable driving means located within housing 1b of the buttering machine and not shown in detail. These may either comprise independent motor means or gearing suitably connected to the motor within housing 1a. The action of the counter-rotating worms 6 and 6a presses the butter milk out of the butter product, thereby separating the same, the butter milk being collected in the sump pan or trough 7 whence it discharges by way of the gooseneck conduit 8. The separated butter corn is continuously transported towards the discharge end 13 of the buttering machine and is forced through the multiple apertures of the perforated plate or disc 14 and thence through the space 14a and again through the multiple apertures of the perforated plates or discs 9, 10 and 11, to finally emerge from the end piece or discharge end 13. Final kneading and working of the butter is accomplished in the spaces intermediate the perforated discs or plates 9, 10 and 10, 11 by way of the paddle or screw wings 12, the screw wing 12a finally pressing the finished butter material away from perforated disc 11 through the end portion 13.

On top of the cylinder portion 5a forming substantially an extension of the press-off cylinder 5 and in the embodiment shown as substantially part thereof, an aperture 15, preferably with a recessed or funnelled rim, is provided. A conduit 15a cooperating with the aperture 15 serves the admission of butter treating material into the interior of the pressing together stage 5a. In the embodiment illustrated in Fig. 1 a salt mill 16 is provided. Salt in the hopper 19 passes continuously into the throat 19a of the mill 16, to be there conventionally ground by, for instance, the conical grinding wheels 18 (only one shown). Grinding wheels 18 are suitably driven by the motor 17 and the ground salt passes through the shaker conduit 16a into the additive conduit 15a and thence through aperture 15 into the pressing together portion 5a of the device. Suitable dimensioning of the salt mill and adjustment of grinding speeds will permit the addition of a predetermined dosage of salt into the butter corn material within the pressing together portion 5a, as may be called for by a required or desired salt content of the ultimate butter product.

Referring to Fig. 2, the salt mill arrangement of Fig. 1 is there substituted by a sprinkler or shower head 20 for the admixture of liquid butter treating additives. By way of further alternatives of substantially single location admixture of additive material and especially in connection with substantially solid additives, there is illustrated in Figs. 3 and 4 a dispersing mechanism for such butter treating additives. The device there shown is particularly suitable for the addition of pulverulent or granular additives to the butter corn goods in the pressing together portion 5a of the device. An electric motor 21 drives the disperser roll 22, which continuously receives the material from hopper 24, shaking the same onto the screen 23. The dispersing roll or shaft 22 is provided with a substantially spirally extending channel for gripping predetermined amounts of the material in hopper 24, distributing the same onto the screen 23. By suitable dimensioning of the channeling on the disperser shaft or roll 22 and the speed adjustment of motor 21, desired dosage of addition of finely divided material through aperture 15 may be obtained.

In the practical operation of the embodiment illustrated in Figs. 1, 3 and 4, the predominant portion of the butter milk has been separated from the butter corn by the time the latter is pressed through the perforated disc 14, leaving only a relatively small and usually insignificant amount of butter milk in the butter corn product as it is worked up in the pressing together portion 5a of the device. The admixture of solid additive at this stage will cause the same to become very finely disseminated throughout the butter corn product, becoming a substantially integral part of the ultimate butter product and without any appreciable loss of added material. The same results hold true when proceeding in accordance with the embodiment exemplified by Fig. 2 in which a substantially liquid additive is provided. Also in this case the major portion of the butter milk has been already removed and the liquid additive is thoroughly worked into the butter corn and thus the ultimate finished butter product. As is shown in the drawings a cooling arrangement, such as cooling jacket 14a, may be provided to control the temperature within the butter milk press-off portion of the press-off cylinder 5.

Figs. 5 and 6 illustrate arrangements where the additive is a washing liquid, such as water. A sprinkler or shower head 25 (Fig. 5) is arranged to discharge dispersed washing liquid into the aperture 15 by way of the conduit 15a. The washing liquid, such as water, is then thoroughly worked into and out of the butter corn, the waste liquid being separated by the pressing together action and collecting in the sump pan or trough 26 to discharge by way of the goose neck conduit 27. Any excess remainder of washing liquid remaining in the pressed together butter corn product as it reaches the perforated plate or disc 14 is removed by the action of forcing the butter corn through the same into the various kneading spaces. An alternative arrangement for the addition of washing liquid is, for instance, illustrated in Fig. 6. As there shown, a direct pipe connection to the regular fresh water system is attached to the press-off cylinder at 28. The fresh water conduit 28a is preferably passed through a heat-exchanger, such as the jacket 29, through which cooling or heating medium may be passed, as may be required by the particular conditions of the buttering process in the machine. The fresh water entering the pressing together portion 5a of the cylinder 5 is worked into and out of the butter corn as the same is being pressed together. The working in and out of the washing liquid, such as water, with respect to the butter corn is accomplished or aided by the two counter-directionally turning worms 6 and 6a arranged in the press-off cylinder substantially throughout the length thereof and positioned relative to each other, as for instance exemplified in Fig. 4. The washing water (Fig. 6) which is continuously separated from the butter corn after having been worked through the same is then discharged by way of an overflow arrangement in the conduit 15a, the waste water passing into the same through aperture 15 and down through waste water conduit 30, being thence discharged through the screen 31 on which any butter particles that may have been carried along by the waste water are collected and may be recovered therefrom.

There is illustrated in Fig. 7 an arrangement by which both a washing liquid and a substantially solid additive may be provided in the pressing together stage of the press-off cylinder. In this case the pressing together stage 5b is somewhat longer than is the case where addition at a single point is made. As there shown, the pressing together portion 5b of the press-off cylinder is provided with a washing liquid arrangement similar to that shown in Fig. 6. In this case the fresh water line is connected to the press-off cylinder 5 at 32 and the waste water discharges through the aperture 33 and extension 33a by way of overflow through the waste discharge conduit 34, any butter particles carried along being retained for recovery on the screen 31a. There is thus defined a washing stage within the pressing together portion 5b of the device. Following this washing stage in the direction of butter transport through the press-off cylinder 5 an arrangement for the introduction of a substantially solid additive is provided. This latter arrangement is somewhat similar to that illustrated in, for instance, Fig. 1. As exemplified by a material which is preferably ground before addition, such as for instance, salt, the grinding mill 36 is secured to the device. Grinding mill 36 is driven by motor 37 and has the grinding wheels 38, preferably of conical shape (only one shown). The material to be ground, such as salt, is continuously passed into the bite of the grinding wheels from the hopper 39 and the ground material is then discharged in dispersed form through the conduit 36a into the additive conduit 35a entering the pressing together stage of the press-off cylinder through the aperture 35. Though not in all cases absolutely essential, it is preferred to arrange a second perforated disc or plate 14c to thereby separate the washing stage from the addition stage of an additive which is designed to remain preponderantly within the product as it ultimately emerges from the buttering machine. The perforated disc or plate 14c aids in separating the major portion of the waste washing liquid from the butter corn so that a wastage of material that may be soluble or dispersible in the washing liquid is avoided to the maximum possible extent. If the washing stage were carried through to and into the next following addition stage the separated amounts of the waste washing liquid would carry a comparatively large proportion of the additive into the wastage.

As is apparent from the foregoing, the method within the broad concept of the invention essentially comprises the substantially continuous addition of a butter treating additive to the butter corn during the pressing together thereof and prior to the kneading of the butter corn into the finished butter product, and the recovery of the additive-treated butter material. The device within the broad concept of my invention for carrying out the novel method thereof essentially comprises the combination of a butter corn pressing together conduit and mechanism therein of a substantially continuous buttering machine and conduit means positioned and adapted to pass a butter additive into said pressing together conduit.

I claim:

1. Method for the addition of butter-treating additives to butter being produced in a continuous butter-making machine of the type in which a mixture of butter milk and butter corn is passed through a press-off cylinder provided with worms for the separation of the butter corn from the butter milk and having means at the end of the press-off cylinder for pressing and kneading the corn to a fine-textured butter product which is continuously delivered from the end of the press-off cylinder, which comprises establishing at least one passage into the press-off cylinder at the place along the press-off cylinder where a major portion of the butter milk has been separated from the butter corn passing through the press-off cylinder prior to the kneading means at the end of the press-off cylinder and substantially continuously adding a butter-treating additive to the butter corn through said passage.

2. Method according to claim 1, in which said additive is washing water and which includes establishing a washing water exit on said press-off cylinder so that the washing water passed into said passage is continuously worked into and out of said butter by the worms and is continuously separated therefrom and removed through said exit.

3. Method according to claim 2, which includes establishing at least one additional passage into said press-off cylinder past the place where the washing water is added and removed from the press-off cylinder and substantially continuously adding a butter-treating additive to the washed butter corn for preponderant retention thereby.

4. Method according to claim 1, in which said additive is a butter-treating material which is substantially continuously added to said butter corn for preponderant retention thereby.

5. In a continuous butter-making machine having a press-off cylinder, with worms for separating butter corn from butter milk, and means at the end of the press-off cylinder for pressing and kneading the butter corn into a fine textured butter product for delivery from the end of the press-off cylinder, perforated partition means positioned in the press-off cylinder at a place where the major portion of the butter milk will have been separated by the worms from butter corn being passed through the press-off cylinder, and conduit means positioned in front of said partition means and dimensioned for the passage of a butter-treating additive into the press-off cylinder.

6. Continuous butter-making machine according to claim 5, in which said conduit means are washing water conduit means and including waste water discharge means positioned in front of said partition means for the discharge of water which has been passed into said cylinder through said conduit means and worked through any butter corn in the cylinder in front of said partition means by the worms.

7. Continuous butter-making machine according to claim 5, including salt grinding and dispensing means dimensioned and positioned for dispensing salt into said conduit means.

8. In a continuous butter-making machine having a press-off cylinder with worms for the separation of butter corn from butter milk and means for pressing and kneading the butter corn into a fine textured butter product at the end of the press-off cylinder for delivery from the press-off cylinder, at least two perforated partitions positioned in the press-off cylinder to define in the direction of butter corn travel a washing zone and a separate pre-kneading zone, said zones being defined near the delivery end of the press-off cylinder prior to the kneading means, first conduit means positioned and dimensioned to pass a washing liquid into said washing zone, first liquid discharge means connected to said washing zone for removing waste washing liquid therefrom, and means positioned and dimensioned for passing additive into said pre-kneading zone.

9. Continuous butter-making machine according to claim 8, in which said conduit means and said means for passing additive into said pre-kneading zone each include at least one aperture defined in the housing of the press-off cylinder.

WILHELM WILSMANN.

References Cited in the file of this patent

UNITED STATES PATENTS

| Number | Name | Date |
|---|---|---|
| 1,678,478 | North | July 24, 1928 |
| 2,407,612 | Lundal et al. | Sept. 10, 1946 |
| 2,414,837 | Riggs | Jan. 28, 1947 |
| 2,466,895 | Horneman et al. | Apr. 12, 1949 |